US012808977B2

(12) United States Patent
Shaw et al.

(10) Patent No.: US 12,808,977 B2
(45) Date of Patent: Nov. 24, 2026

(54) SYSTEMS, METHODS, AND DEVICES FOR INTERFERENCE CANCELLATION IN WIRELESS DEVICE RADAR OPERATION

(71) Applicant: Cypress Semiconductor Corporation, San Jose, CA (US)

(72) Inventors: Amit Shaw, Bangalore (IN); Kiran Uln, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 231 days.

(21) Appl. No.: 18/733,359

(22) Filed: Jun. 4, 2024

(65) Prior Publication Data

US 2025/0370092 A1 Dec. 4, 2025

(51) Int. Cl.
*G01S 7/03* (2006.01)
*G01S 7/41* (2006.01)

(52) U.S. Cl.
CPC .............. *G01S 7/038* (2013.01); *G01S 7/414* (2013.01)

(58) Field of Classification Search
CPC ........... G01S 7/006; G01S 7/038; G01S 7/414
See application file for complete search history.

(56) References Cited

U.S. PATENT DOCUMENTS 7,202,812 B2 * 4/2007 Krikorian ............... G01S 7/038 342/159
7,421,017 B2 * 9/2008 Takatsu ............. H03H 21/0012 375/232
9,252,831 B2 * 2/2016 Rimini ................... H04B 1/525
9,553,712 B2 * 1/2017 Webb .................... H04L 5/1461
9,689,967 B1 * 6/2017 Stark ..................... G01S 7/0233
9,791,564 B1 * 10/2017 Harris ................... G01S 13/931
10,243,719 B2 * 3/2019 Bharadia ................ H04B 1/525
11,428,778 B2 * 8/2022 Bauduin ............... G01S 13/584
12,061,286 B2 * 8/2024 Rimini ..................... A61B 5/05
2003/0007553 A1 * 1/2003 Fifield ...................... H04B 1/30 375/232
2006/0273952 A1 * 12/2006 Krikorian ............... G01S 7/038 342/159
2014/0247757 A1 * 9/2014 Rimini ................... H04B 1/525 370/278
2014/0348018 A1 * 11/2014 Bharadia .................. H04B 1/56 370/278
2015/0055568 A1 * 2/2015 Jindal ................... H04L 5/0048 370/329
2015/0146589 A1 * 5/2015 Webb ..................... H04B 1/525 370/282
2018/0106884 A1 * 4/2018 Marr ........................ G01S 7/354
2020/0132805 A1 * 4/2020 Lehne ..................... G01S 7/038
(Continued)

*Primary Examiner* — Peter M Bythrow

(57) ABSTRACT

Systems, methods, and devices perform interference cancellation operations for wireless devices. Methods may include transmitting an input signal using a transmitter of a transceiver included in a wireless device, and receiving an interference signal at a receiver of the transceiver, wherein the interference signal includes one or more of an over-the-air leakage signal and a reflected signal. Methods may also include performing interference cancellation operations on the interference signal based, at least in part, on one or more adjustments to the receiver determined based on the input signal and the received interference signal, and generating, using the transceiver, an output signal based, at least in part, on the interference cancellation operations.

20 Claims, 12 Drawing Sheets

(56) References Cited

U.S. PATENT DOCUMENTS

| | | | | |
|---|---|---|---|---|
| 2020/0229102 | A1 * | 7/2020 | Gubeskys | H04W 52/146 |
| 2020/0297236 | A1 * | 9/2020 | Rimini | G01S 13/10 |
| 2022/0404466 | A1 * | 12/2022 | Jones | G01S 7/414 |

* cited by examiner

SYSTEMS, METHODS, AND DEVICES FOR INTERFERENCE CANCELLATION IN WIRELESS DEVICE RADAR OPERATION

TECHNICAL FIELD

This disclosure relates to wireless devices, and more specifically, to enhancement of interference cancellation for such wireless devices.

BACKGROUND

Wireless devices may include transceivers configured to generate and receive wireless signals in accordance with one or more wireless communications protocols. Accordingly, such transceivers may include transmit chains and receive chains configured to implement transmit operations and receive operations, respectively. Conventional wireless devices remain limited because the transmit chains and receive chains might not be entirely isolated, and interference from transmitted signals may affect signals received at the receive chain.

DETAILED DESCRIPTION

Figure 1:
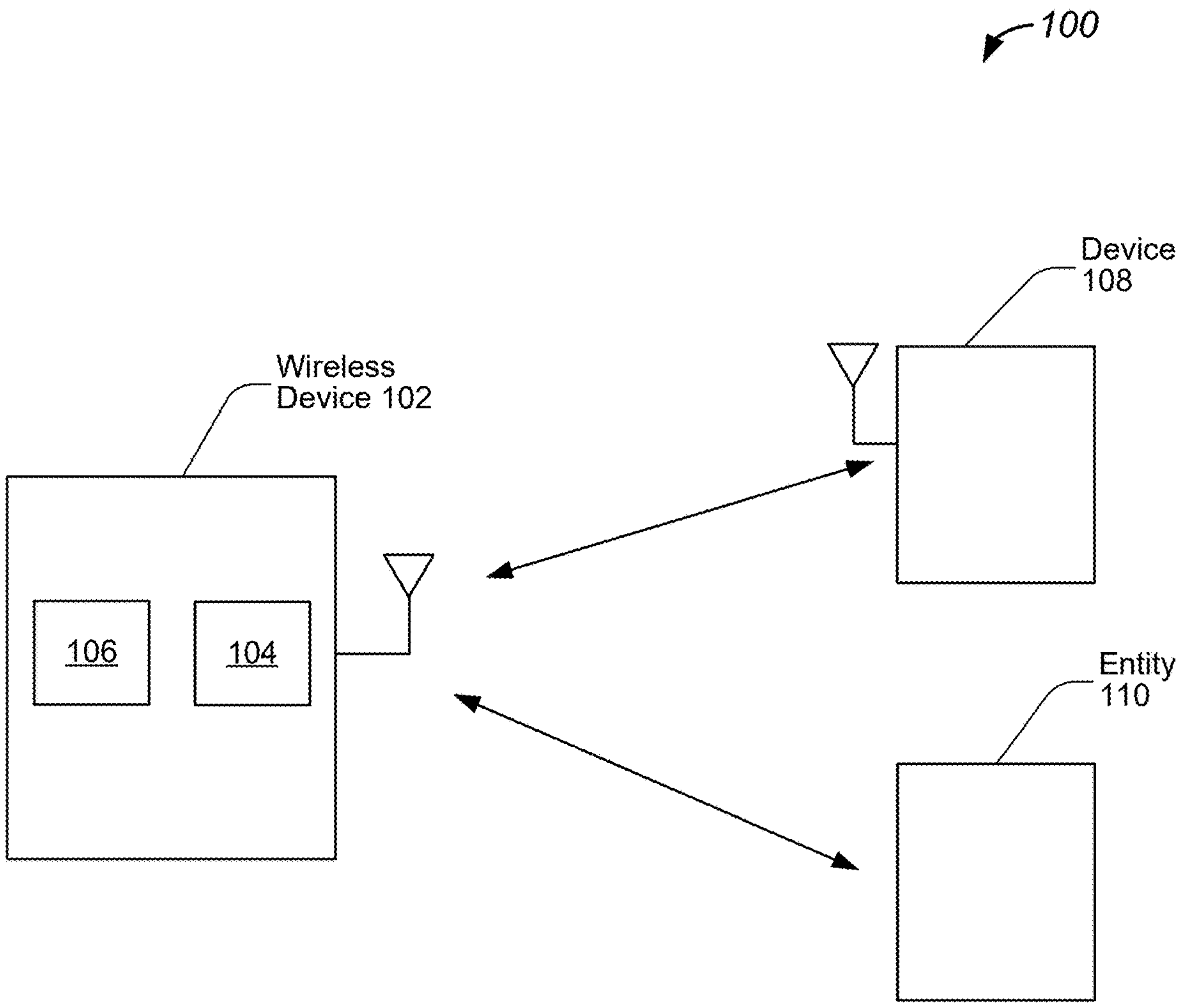
FIG. 1 illustrates an example of a wireless system, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless devices may include transceivers that include components configured to perform transmit and receive operations for wireless communications. For example, a transceiver may include a transmit chain of components that generate a signal provided to an antenna for transmission, and also include a receive chain of components that receive a signal via another antenna. In some embodiments, wireless devices may toggle between a wireless communications mode and a radar mode. When in a wireless communications mode, the transceiver may be configured to transmit and receive data packets in accordance with a wireless communications protocol, such as a Wi-Fi protocol. When in a radar mode, the transceiver may be reconfigured to perform radar operations based on transmission of signals and reception of reflected signals during the radar mode.

Proximity between the transmit and receive antennas may result in interference between the transmit chain and the receive chain. For example, radio leakage may occur where signals originating from the transmit chain and transmit antenna may interfere with signals received via the receive chain and receive antenna. Such interference may interfere with reflected signals being received, and thus reduce accuracy of radar detection operations. Moreover, other sources of interference, such as reflections from objects within an ambient environment of the wireless device may also interfere with presence detection of entities of interest, as well as other radar operations such as distance estimation and speed estimation.

Accordingly, embodiments disclosed herein provide techniques for reducing and/or eliminating such interference components. As will be discussed in greater detail below, interference cancellation operations may be performed by, for example, one or more adaptive filters, to reduce an amount of interference experienced by a receive chain of the transceiver. For example, a calibration phase may be performed to calibrate an adaptive filter to compensate for over-the-air leakage, on chip-leakage as well as ambient reflections that are not of interest for radar operations. The trained adaptive filter may then apply interference cancellation during radar operation to mitigate and reduce interference in real-time. In this way, interference cancellation operations may be performed at one or more locations along the receive chain to improve the accuracy and efficacy of interference mitigation and radar operations. Moreover, such interference cancellation may be performed in a time domain and/or a frequency domain.

FIG. 1 illustrates an example of a wireless system, configured in accordance with some embodiments. Accordingly, a system, such as system 100, may include wireless devices that are used for wireless communications, and are also configured to be able to detect the presence of objects using wireless communications channels associated with such wireless devices. As will be discussed in greater detail below, wireless devices included in system 100 may be configured to reduce interference that may otherwise affect such presence detection and radar operations, thus improving the efficacy and accuracy of such presence detection and radar operations.

In some embodiments, system 100 includes wireless device 102 which is configured to transmit and receive wireless signals in accordance with one or more communications protocols. For example, wireless device 102 may include one or more transceivers, such as transceiver 104, which is configured to transmit and receive signals in accordance with a wireless communications protocol, such as a Wi-Fi protocol. In various embodiments, wireless device 102 additionally includes a processing device, such as processing device 106, which is configured to implement various hardware and logic associated with transceiver 104, and its associated wireless communications protocol. For example, processing device 106 may be configured to implement a medium access control (MAC) layer that is configured to control hardware associated with a wireless transmission medium, such as that associated with a Wi-Fi transmission medium.

In various embodiments, wireless device 102 is within communications range of one or more devices or entities. In one example, wireless device 102 is within range of device 108, which may be another wireless device. Accordingly, device 108 may also include a transceiver and associated processing logic configured to facilitate wireless communications in accordance with a wireless communications protocol, such as a Wi-Fi protocol. Thus, wireless device 102 may be configured to establish a wireless connection with device 108, and transmit and receive data packets to and from device 108. In one example, wireless device 102 may be configured as a central device, such as an access point (AP), and device 108 may be configured as a peripheral device, such as a station (STA).

Moreover, wireless device 102 is also in range of entity 110. In various embodiments, entity 110 may be an object or a person within range of wireless device 102 and the target of radar ranging operations when wireless device 102 is in a radar mode. As will be discussed in greater detail below, wireless device 102 is configured to identify the presence of entity 110 based on radar operations performed using wireless communications channels that may also be used to communicate with devices, such as device 108. In this way, system 100 may support wireless communication as well as presence detection associated with entities, such as objects and humans within range of wireless device 102.

Moreover, as will also be discussed in greater detail below, components of wireless device 102 are configured to reduce interference experienced during such presence detection operations. For example, calibration operations may be performed to identify components of an interference signal, and selectively cancel them thus removing such interference signal components from a received signal at transceiver 104. Additional details regarding such calibration and interference cancellation operations are discussed in greater detail below.

Figure 2:
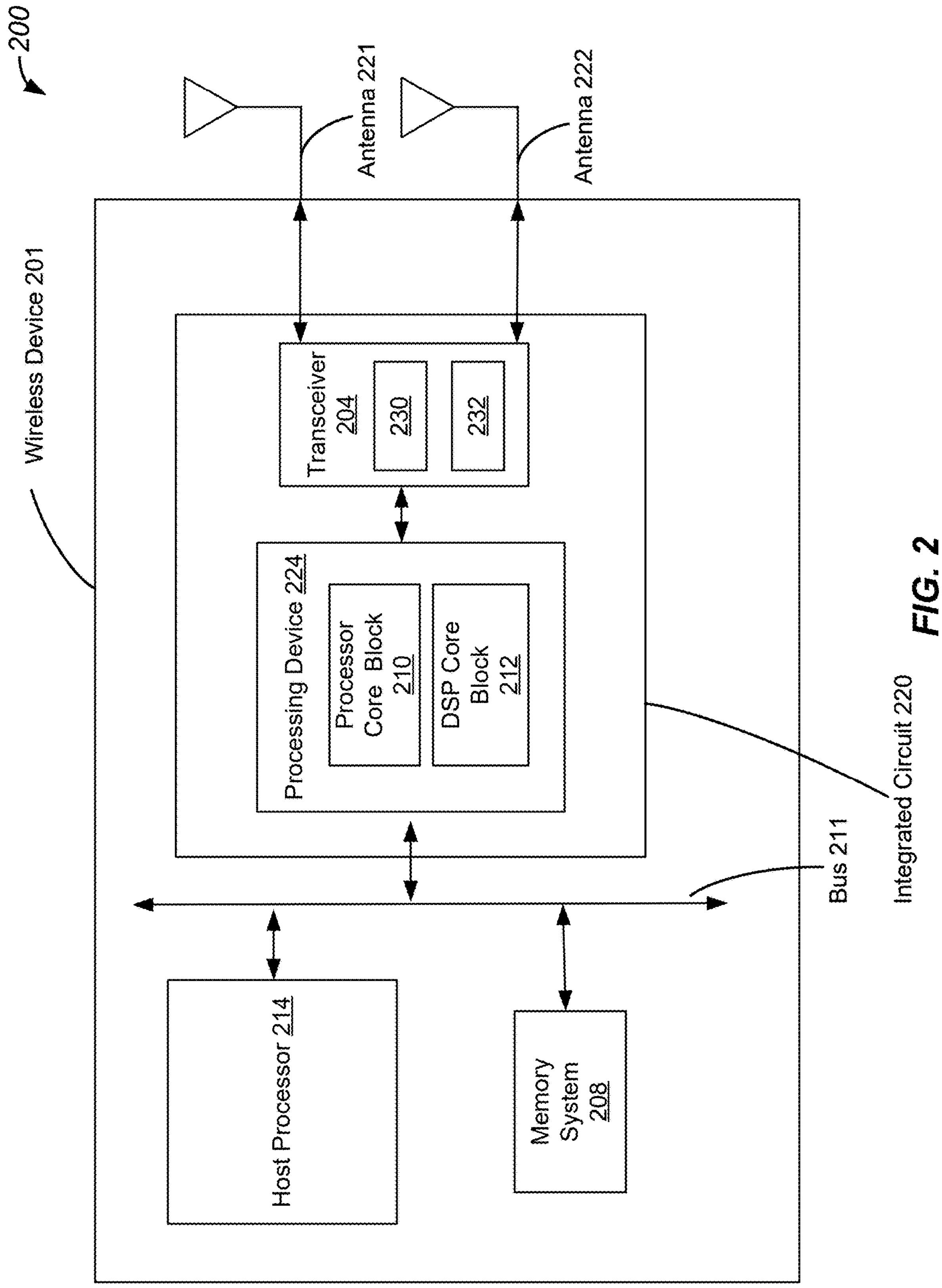
FIG. 2 illustrates an example of a wireless device, configured in accordance with some embodiments.

FIG. 2 illustrates an example of a wireless device, configured in accordance with some embodiments. More specifically, FIG. 2 illustrates an example of a system, such as system 200, that may include wireless device 201. It will be appreciated that wireless device 201 may be one of any of the wireless devices discussed above with reference to FIG. 1, such as wireless device 102 and device 108.

In various embodiments, wireless device 201 includes one or more transceivers, such as transceiver 204. In one example, wireless device 201 includes transceiver 204 which is configured to transmit and receive signals using a communications medium that may be accessed and used via antenna 221. As noted above, transceiver 204 may be a Wi-Fi transceiver. Accordingly, transceiver 204 may be compatible with a wireless communications protocol, such as a Wi-Fi protocol. In various embodiments, transceiver 204 includes a modulator and demodulator as well as one or more buffers and filters, that are configured to generate and receive signals via antenna 221. Accordingly, as will be discussed in greater detail below, transceiver 204 may include chains of components configured to perform such operations, such as a transmit chain and a receive chain. Each of the transmit chain and receive chain may be included in a transmitter and receiver respectively, such as transmitter 230 and receiver 232. Moreover, as will also be discussed in greater detail below, transceiver 204 and processing device 224 may be configured to perform interference cancellation operations to cancel components of interference that might otherwise be received by transceiver 204.

In various embodiments, system 200 further includes one or more processing devices, such as processing device 224 which may include logic implemented using one or more processor cores. Accordingly, processing device 224 is configured to implement logic for presence detection operations. For example, processing device 224 may be configured to use wireless connection metrics and other channel information to infer the presence of one or more entities within a wireless communications range of wireless device 201. Accordingly, processing device 224 may be configured to perform radar operations and presence determination operations when configured in a radar mode. In one example, toggling between a communications mode and a radar mode may be implemented via logic implemented in firmware. Accordingly, processing device 224 includes processing elements, that may be implemented in firmware, configured to perform wireless communication operations in which data packets are transmitted and received, may also be configured to perform presence detection operations, as well as operations to switch between the two. It will be appreciated that the radar operations and computations may be any suitable radar computation technique using frequency and phase measurements and data as well as other available signal metrics.

Processing device 224 includes one or more components configured to implement a media access control (MAC) layer that is configured to control hardware associated with a wireless transmission medium, such as that associated with a Wi-Fi transmission medium. In one example, processing device 224 may be configured to implement a driver, such as a Wi-Fi driver. Accordingly, processing device 224 may include components associated with transceiver 204, such as MAC layers, packet traffic arbiters, and a scheduler. In various embodiments, processing device 224 includes processing blocks, such as processor core block 210 and DSP core block 212, to implement these features.

System 200 further includes antenna 221 and antenna 222 which are configured to transmit and receive wireless signals. In one example, antenna 221 may be coupled to transmitter 230, and may be used to transmit signals. Moreover, antenna 222 may be coupled to receiver 232, and may be used to receive signals. In various embodiments, wireless device 201 may also include a switch that may be configured to select a transmit chain or a receive chain to be coupled antenna 221 and/or antenna 222 for transmission/reception.

System 200 includes memory system 208 which is configured to store one or more data values associated with interference cancellation operations discussed in greater detail below. Accordingly, memory system 208 includes storage device, which may be a non-volatile random-access memory (NVRAM) configured to store such data values, and may also include a cache that is configured to provide a local cache. In various embodiments, system 200 further includes host processor 214 which is configured to implement processing operations implemented by system 200.

It will be appreciated that one or more of the above-described components may be implemented on a single integrated circuit, or on different integrated circuits. For example, transceiver 204 and processing device 224 may be implemented on the same integrated circuit, such as integrated circuit 220. In another example transceiver 204 and processing device 224 may each be implemented on their own integrated circuit, and thus may be disposed separately as a multi-die module or on a common substrate such as a printed circuit board (PCB). It will also be appreciated that components of system 200 may be implemented in a variety of context, such as the context of a smart home environment, an automotive environment, or a wireless environment including Internet of Things (IoT) devices.

Figure 3:
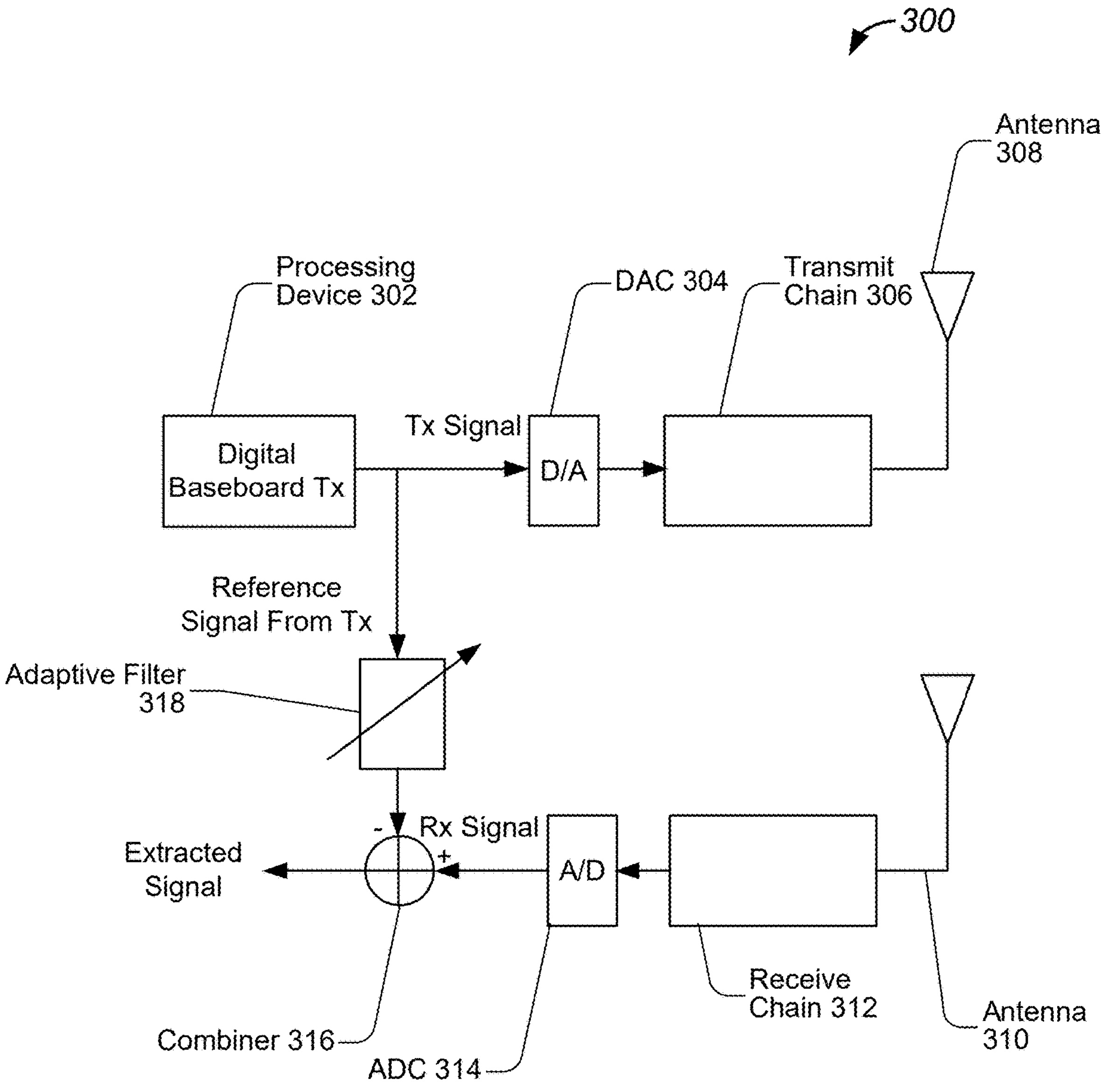
FIG. 3 illustrates an example of a wireless device configured to perform interference cancellation operations in accordance with some embodiments.

FIG. 3 illustrates an example of a wireless device configured to perform interference cancellation operations in accordance with some embodiments. Accordingly, a device, such as device 300, may include components that are configured to perform wireless communications, and that are also configured to be able to detect the presence of objects using wireless communications channels associated with such wireless devices. As will be discussed in greater detail below, device 300 may perform various calibration operations to identify and mitigate various components of interference experienced by device 300. In various embodiments, such interference may include over-the-air leakage, on chip-leakage as well as reflected signals from static objects that are not of interest for a radar mode of operation.

In various embodiments, device 300 includes processing device 302. As discussed above, processing device 302 may be configured to implement a digital baseband for device 300, and may be configured to generate a signal for transmission via antenna 308. Accordingly, processing device 302 may generate a signal, and may provide the signal to digital to analog converter (DAC) 304. DAC 304 may then provide an analog output to transmit chain 306. In various embodiments, transmit chain 306 includes components such as a filter, a mixer and a power amplifier. The output of transmit chain 306 may then be transmitted via antenna 308.

Device 300 further includes receive chain 312 which may include a low-noise amplifier, a mixer and a filter, and may be coupled to antenna 310. In various embodiments, receive chain 312 may receive signals via antenna 310, and provide an analog input to analog to digital converter (ADC) 314. ADC 314 may then provide a digital signal to combiner 316, which may combine the signal with an output of adaptive filter 318, discussed in greater detail below. The output of combiner 316 may be provided to other components of device 300 as a received signal.

In various embodiments, device 300 includes adaptive filter 318 which is configured to modify the received signal via combiner 316. As shown in FIG. 3, adaptive filter 318 may be coupled to processing device 302 and may receive the signal generated by processing device 302 as a reference signal. Adaptive filter 318 may also receive an output of combiner 316 as an error signal. Accordingly, during calibration operations, adaptive filter 318 may be trained to generate a signal that cancels received interference via combiner 316.

For example, during a calibration phase, a known signal, such as a training signal, may be generated by processing device 302 and transmitted. During the calibration phase, one or more parameters of adaptive filter 318 may be calibrated to cancel resulting interference experienced by the receiver. More specifically, adaptive filter 318 may be a least means square filter having one or more weights configured to control an output of adaptive filter 318. During calibration operations, the weights may be adjusted until an output of combiner 316 is below a designated threshold level. In this way, interference resulting from over-the-air leakage, on-chip leakage as well as static reflections may be canceled and removed from ordinary radar operations. During a calibration phase, updates of adaptive filter weights may be performed using iterative or recursive methods like Least Mean Squared (LMS), Recursive Least Squared (RLS), Minimum Mean Squared Estimate (MMSE), or any other suitable method.

Figure 4:
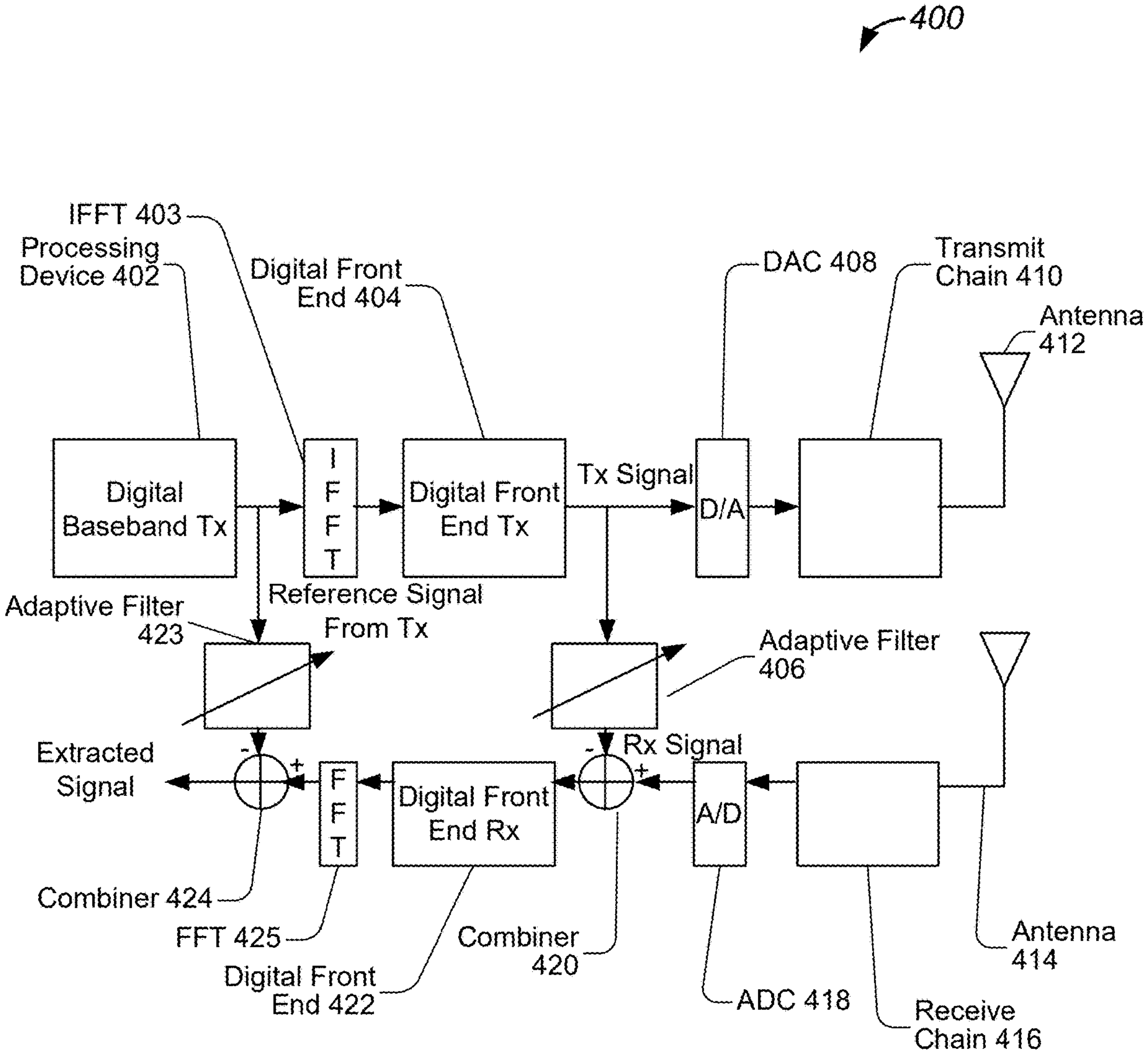
FIG. 4 illustrates another example of a wireless device configured to perform interference cancellation operations in accordance with some embodiments.

FIG. 4 illustrates another example of a wireless device configured to perform interference cancellation operations in accordance with some embodiments. Accordingly, a device, such as device 400, may include components that are configured to perform wireless communications, and that are also configured to be able to detect the presence of objects using wireless communications channels associated with such wireless devices. As will be discussed in greater detail below, device 400 may perform various calibration operations to identify and mitigate various components of interference experienced by device 400. Moreover, interference cancellation operations may be performed in both a frequency domain and a time domain.

In various embodiments, device 400 includes processing device 402. As discussed above, processing device 402 may be configured to implement a digital baseband for device 400, and may be configured to generate a signal for transmission via antenna 412. Accordingly, processing device 402 may generate a signal, and may provide the signal to digital to analog converter (DAC) 408 via inverse fast-Fourier transform 403 and digital front end 404 which may perform a conversion of the transmitted signal from a frequency domain to a time domain. DAC 408 may then provide an analog output to transmit chain 410. In various embodiments, transmit chain 410 includes components such as a filter, a mixer and a power amplifier. The output of transmit chain 406 may then be transmitted via antenna 412.

Device 400 further includes receive chain 416 which may include a low-noise amplifier, a mixer and a filter, and may be coupled to antenna 414. In various embodiments, receive chain 416 may receive signals via antenna 414, and provide an analog input to analog to digital converter (ADC) 418. ADC 418 may then provide a digital signal to combiner 420, which may combine the signal with an output of adaptive filter 406, discussed in greater detail below. An output of combiner 420 may be provided to digital front end 422 and fast-Fourier transform (FFT) 425 which may perform a conversion of the receive signal from the time domain to the frequency domain. The output may then be provided to combiner 424, which may combine the signal with an output of adaptive filter 426, discussed in greater detail below. The output of combiner 424 may be provided to other components of device 400 as a received signal.

In various embodiments, device 400 includes adaptive filter 406 and adaptive filter 423 which are configured to modify the received signal via combiner 420 and combiner 424 respectively. As shown in FIG. 4, adaptive filter 406 may be coupled to digital front end 404 and may receive the signal generated by processing device 402 as a reference signal via digital front end 404. Adaptive filter 406 may also receive an output of combiner 420 as an error signal. Accordingly, during calibration operations, adaptive filter 406 may be trained to generate a signal that cancels received interference via combiner 420. As similarly discussed above, adaptive filter 406 may be a least means square filter having one or more weights configured to control an output of adaptive filter 406. During calibration operations, the weights may be adjusted until an output of combiner 416 is below a designated threshold level.

Moreover, adaptive filter 423 may be coupled to processing device 402 and may receive the signal generated by processing device 402 as a reference signal. Adaptive filter 423 may also receive an output of combiner 424 as an error signal. Accordingly, during calibration operations, adaptive filter 423 may be trained to generate a signal that cancels received interference via combiner 424. As similarly discussed above, adaptive filter 423 may be a least means square filter having one or more weights configured to control an output of adaptive filter 423. During calibration operations, the weights may be adjusted until an output of combiner 424 is below a designated threshold level.

Thus, according to various embodiments, adaptive filter 406 may be implemented in a time domain, and may perform interference cancellation operations in the time domain. Such time domain-based interference cancellation may provide relatively strong and course adjustments which may be suited for some types of interference, such as over-the-air leakage and on chip-leakage. Moreover, adaptive filter 423 may be implemented in a frequency domain, and may perform interference cancellation operations in the frequency domain. Such frequency domain-based interference cancellation may provide relatively precise and fine adjustments which may be suited for additional types of interference, such as static reflections, or reflections from objects that are not of interest.

Figure 5:
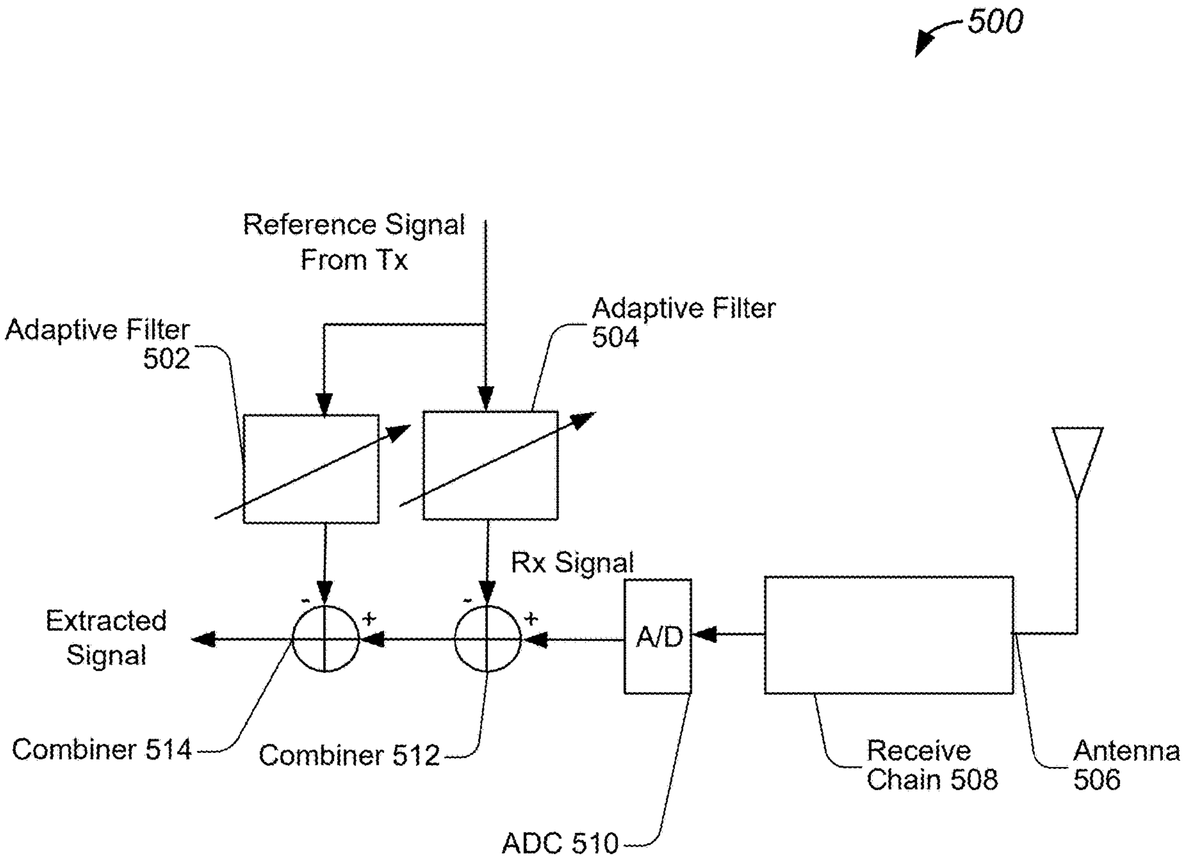
FIG. 5 illustrates an additional example of a wireless device configured to perform interference cancellation operations in accordance with some embodiments.

FIG. 5 illustrates an additional example of a wireless device configured to perform interference cancellation operations in accordance with some embodiments. In various embodiments, adaptive filters may be implemented in a multi-stage arrangement. As shown in FIG. 5, device 500 may include antenna 506 coupled to receive chain 508 and ADC 510. Moreover, an output of ADC 510 may be provided to combiner 512, which may provide an output to combiner 514.

Device 500 further includes adaptive filter 502 and adaptive filter 504 which are coupled to combiner 514 and combiner 512 respectively. Adaptive filter 502 and adaptive filter 504 may receive a reference signal from a processing device (not shown in FIG. 5), as previously discussed. Accordingly, multiple stages of adaptive filters may be implemented in the same domain, and may be implemented using multiple tap points within a receiver. As shown in FIG. 5, both stages are implemented in a time domain. Moreover, one adaptive filter may be configured for interference cancellation of over-the-air leakage and in chip-leakage, while the other adaptive filter is configured for interference cancellation of static reflections. As similarly discussed above, the adaptive filters may receive error signals from their respective combiners and be calibrated to reduce components of interference signals.

In various embodiments, a configuration as shown in FIG. 5 provides grouping of various types of interference for calibration and cancellation in steps that may be applied serially thus reducing a complexity of overall processing. For example, strong on-chip leakage and a direct antenna coupled signal may be grouped into one set while reflection from static objects at a certain range of distance can be grouped in one or more additional sets. Calibration of such multi-stage cancellation adaptive filters can be done in steps where adaptive filters are configured to cancel a most dominant interferer as may be defined by signal power, which may be calibrated and cancelled first in receive chain. Moreover, the adaptive filter may subsequently cancel an interference having a next dominant power. In this way, interference sources may be grouped and canceled in an order determined based on one or more features, such as a power metric.

Figure 6:
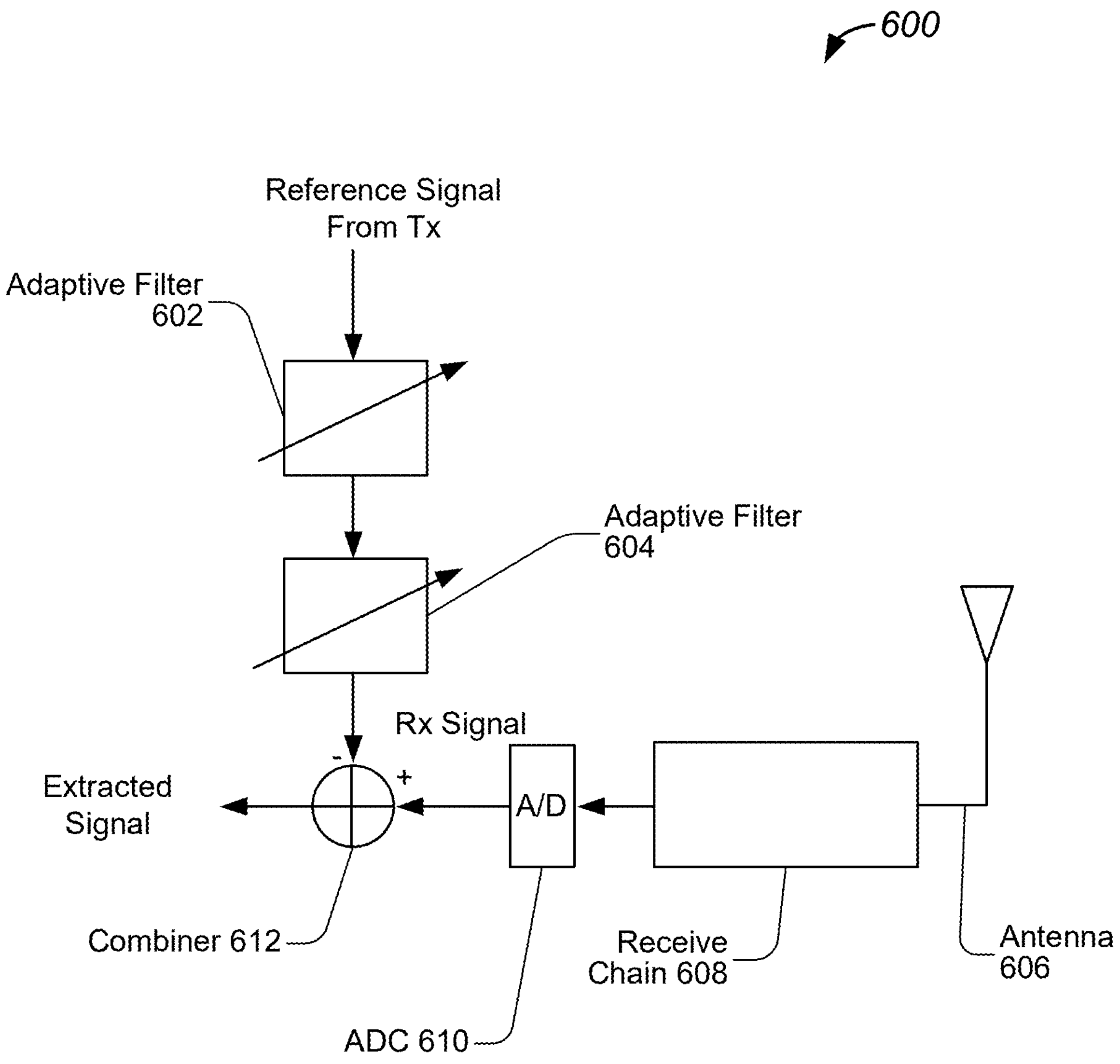
FIG. 6 illustrates another example of a wireless device configured to perform interference cancellation operations in accordance with some embodiments.

FIG. 6 illustrates another example of a wireless device configured to perform interference cancellation operations in accordance with some embodiments. As similarly discussed above, adaptive filters may be implemented in a multi-stage arrangement. As shown in FIG. 6, device 600 may include antenna 606 coupled to receive chain 608 and ADC 610. Moreover, an output of ADC 610 may be provided to combiner 612.

Device 600 further includes adaptive filter 602 and adaptive filter 604, which is coupled to combiner 614. Adaptive filter 602 may receive a reference signal from a processing device (not shown in FIG. 6), as previously discussed. Moreover, adaptive filter 602 may provide an output to adaptive filter 604. Accordingly, multiple stages of adaptive filters may be implemented in the same domain and in series, thus using a single tap point within the receiver. As shown in FIG. 6, both stages are implemented in a time domain. Moreover, one adaptive filter may be configured for interference cancellation of over-the-air leakage and on chip-leakage, while the other adaptive filter is configured for interference cancellation of static reflections. As similarly discussed above, the adaptive filters may receive error signals from combiner 612, and may be calibrated to reduce components of interference signals.

In various embodiments, a configuration as shown in FIG. 6 provides grouping of various types of interference for calibration and cancellation in steps that may be applied serially thus reducing a complexity of overall processing. For example, strong on-chip leakage and a direct antenna coupled signal may be grouped into one set while reflection from static objects at a certain range of distance can be grouped in one or more additional sets. Calibration of such multi-stage cancellation adaptive filters can be done in steps where adaptive filters are configured to cancel a most dominant interferer as may be defined by signal power, which may be calibrated first. Moreover, the adaptive filter may subsequently cancel an interference having a next dominant power. In this way, interference sources may be grouped and canceled in an order determined based on one or more features, such as a power metric.

Figure 7:
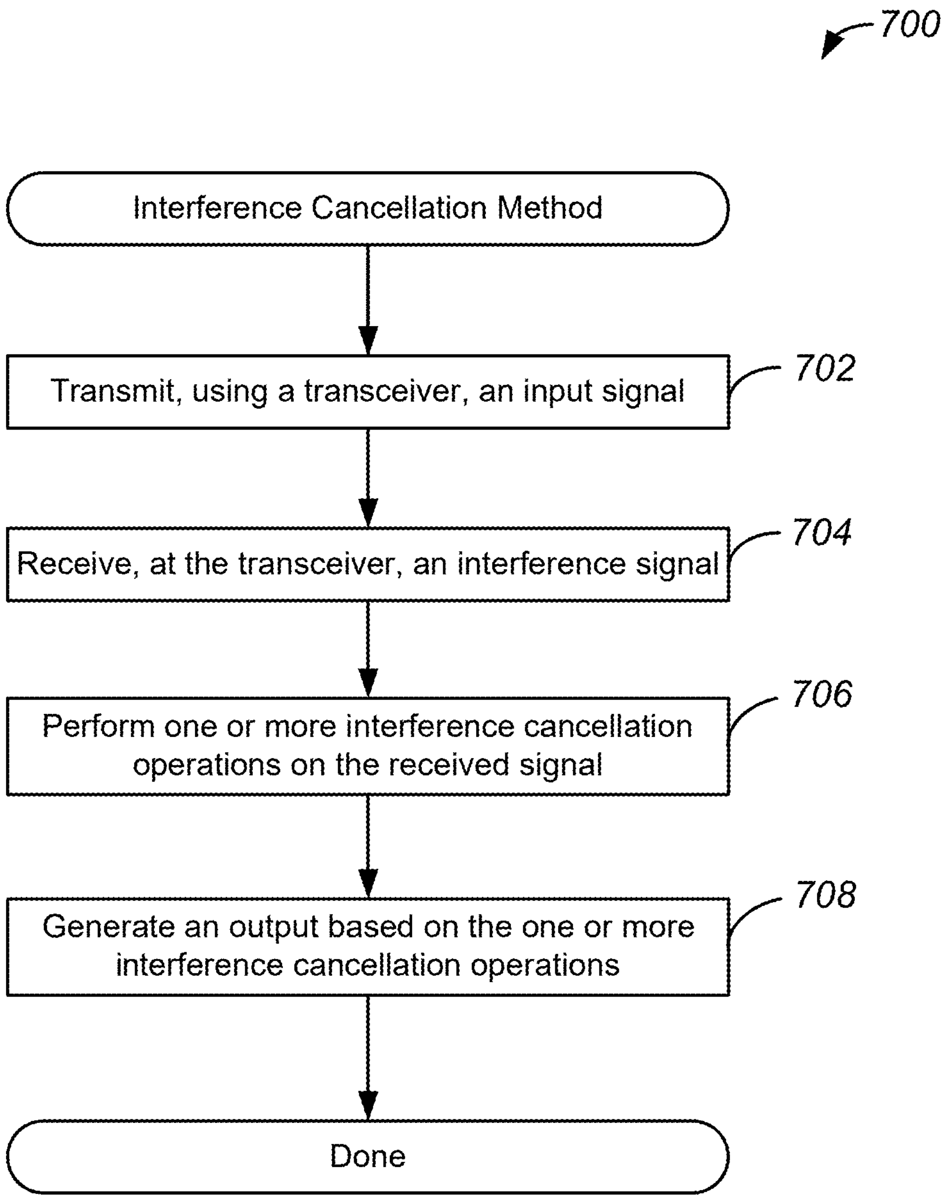
FIG. 7 illustrates an example of a method for interference cancellation, performed in accordance with some embodiments.

FIG. 7 illustrates an example of a method for interference cancellation, performed in accordance with some embodiments. As similarly discussed above, various interference cancellation operations may be performed to mitigate interference that may result from, for example, over-the-air leakage, on chip-leakage and/or static reflections from objects within an operational environment of a wireless device that are not objects of interest. Accordingly, a method, such as method 700, may be performed to implement interference cancellation operations to mitigate and reduce such interference.

Method 700 may perform operation 702 during which an input signal may be transmitted. As similarly discussed above, the input signal may be a designated signal, such as a training signal, generated and transmitted via a transmit chain of a transceiver during a calibration phase. Accordingly, the training signal may have a known data pattern as well as one or more transmission parameters configured to emulate signals used during radar detection operations.

Method 700 may perform operation 704 during which an interference signal maybe received. As also discussed above, a receiver included in the transceiver may receive a signal as a result of the transmitting. For example, interference may occur at the receive chain as a result of transmission activity on the transmit chain. In one example, the interference may be over-the-air leakage and on chip-leakage between the transmitter and the receiver that results in a leakage signal being received at the receiver while the transmitter is transmitting the input signal. In various embodiments, the interference signal may also be generated by ambient reflections of the transmitted signal from objects within the operational environment of the wireless device.

Method 700 may perform operation 706 during which one or more interference cancellation operations may be performed. As similarly discussed above and as will be discussed in greater detail below, one or more interference cancellation operations may include a calibration phase and may also be performed during radar operation. As discussed above and as will be discussed in greater detail below, the interference cancellation operations may be performed at one or more stages of a receiver, and in a time domain as well as a frequency domain.

Method 700 may perform operation 708 during which an output may be generated based on the one or more interference cancellation operations. Accordingly, once the calibration phase is complete, the transceiver may return to radar operation. Based on the previously described calibrations, the receiver may receive a reflected signal along with interference signal, mitigate interference that may occur due to leakage, and generate an output representing the desired reflected received signal for further processing.

Figure 8:
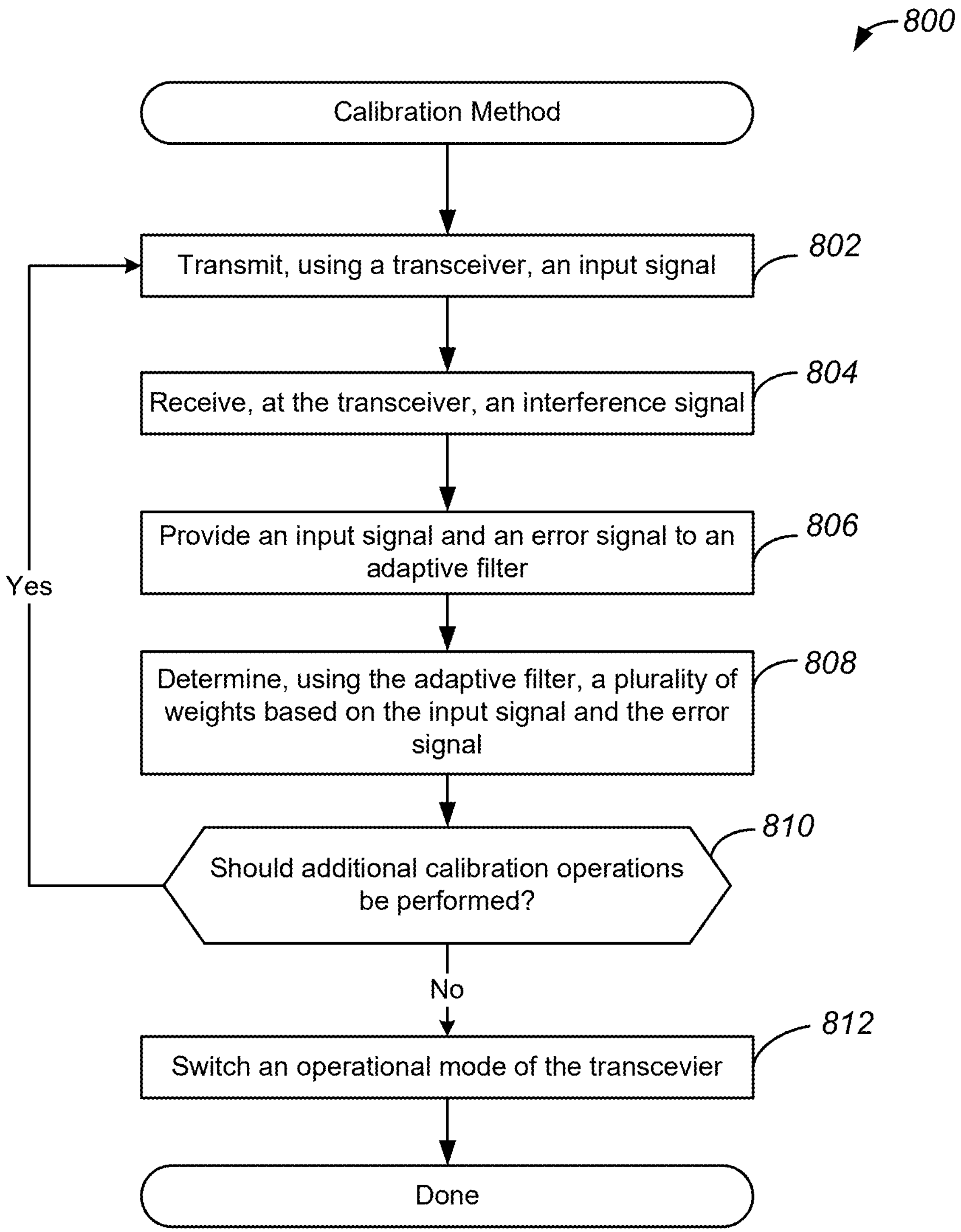
FIG. 8 illustrates an example of a method for calibration, performed in accordance with some embodiments.

FIG. 8 illustrates an example of a method for calibration, performed in accordance with some embodiments. As similarly discussed above, various interference cancellation operations may be performed to mitigate interference that may result from, for example, over-the-air leakage, on chip-leakage and/or static reflections from objects within an operational environment of a wireless device that are not objects of interest. In various embodiments, a method, such as method 800, may be performed to implement calibration operations to configure one or more components of a transceiver to mitigate and reduce interference for a given set of operational parameters.

Method 800 may perform operation 802 during which an input signal may be transmitted. As similarly discussed above, the input signal may be a designated signal, such as a training signal, generated and transmitted via a transmit chain of a transceiver during a calibration phase. Accordingly, the training signal may have a known data pattern as well as one or more transmission parameters configured to emulate signals used during radar detection operations.

Method 800 may perform operation 804 during which an interference signal maybe received. As also discussed above, a receiver included in the transceiver may receive a signal as a result of the transmitting. For example, interference may occur at the receive chain as a result of transmission activity on the transmit chain. In one example, the interference may be over-the-air leakage between the transmitter and the receiver that results in a leakage signal being received at the receiver while the transmitter is transmitting the input signal. In various embodiments, the interference signal may also be generated by ambient reflections of the transmitted signal from objects within the operational environment of the wireless device.

Method 800 may perform operation 806 during which an input signal and an error signal may be provided to an adaptive filter. In various embodiments, the input signal is the signal transmitted during operation 802. In one example, an output of a processing device used to generate the input signal is provided to the adaptive filter as a reference signal. Moreover, an output of the receiver, which may be generated by a combiner as discussed above, may also be provided to the adaptive filter as an error signal.

Method 800 may perform operation 808 during which a plurality of weights may be determined based on the input signal and the error signal. Accordingly, as similarly discussed above, one or more weights configured to control an operation of the adaptive filter may be adjusted. In various embodiments, such an adjustment may be performed in accordance with one or more adjustment parameters, such as a designated step size that determines an amount of an increment of an adjustment that should be made to one or more weights.

Method 800 may perform operation 810 during which it may be determined if additional calibration operations should be performed. In various embodiments, such a determination may be made based on a comparison of one or more parameters of the output of the receiver and one or more designated parameters. For example, an amplitude of an output of the receiver may be compared against a designated threshold value. Such a designated threshold value may be determined by an entity, such as a manufacturer or a user. If it is determined that the amplitude of the output exceeds the designated threshold value, method 800 may return to operation 802. If it is determined that the amplitude of the output is below the designated threshold value, it may be determined that sufficient calibration has been performed, and method 800 may proceed to operation 812.

Accordingly, during operation 812, the transceiver may switch operational modes. Thus, the transceiver may switch from the calibration mode to an operational mode used for radar operations. As will be discussed in greater detail below, during the operational mode, the adaptive filter may apply one or more adjustments to a received signal to apply interference cancellation and mitigation to the output signal.

Figure 9:
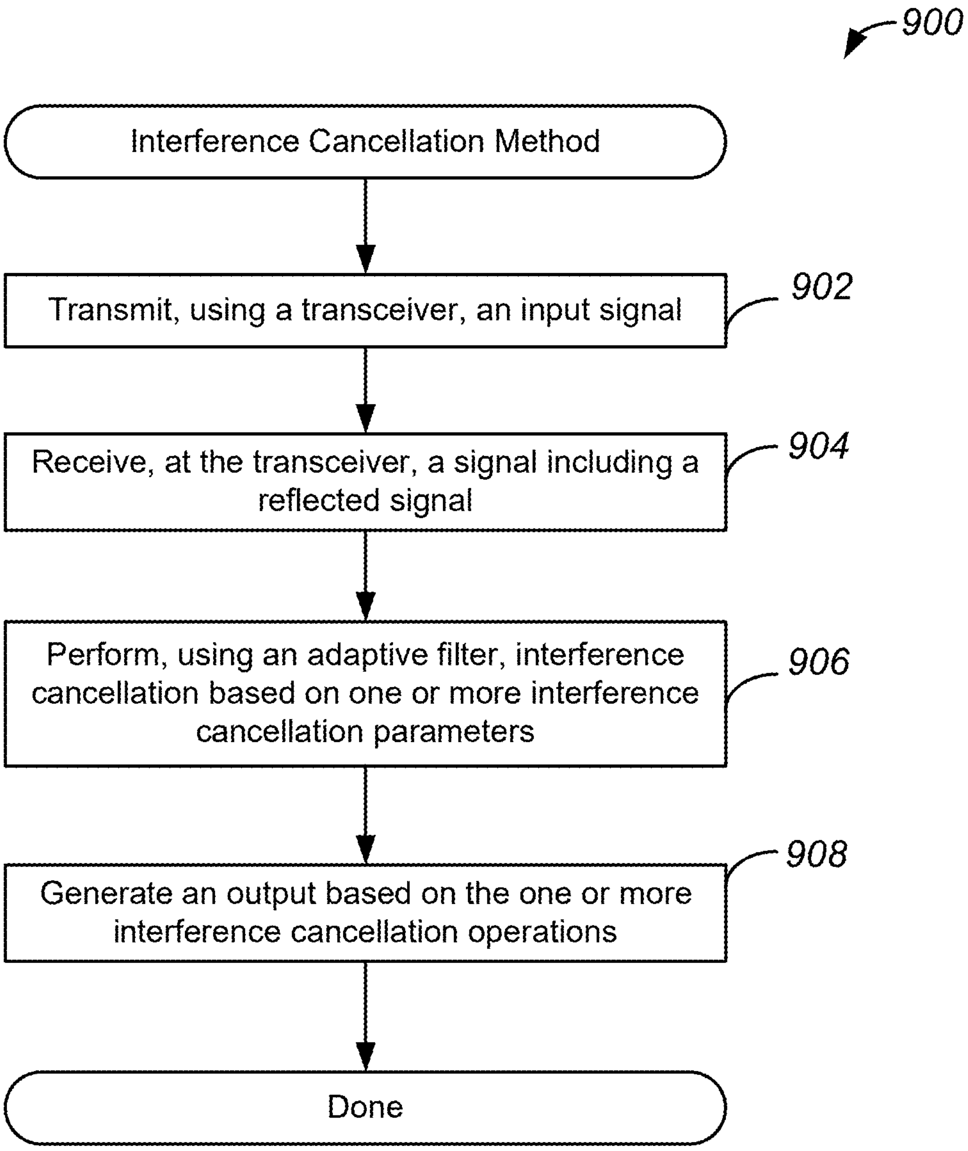
FIG. 9 illustrates an additional example of a method for interference cancellation, performed in accordance with some embodiments.

FIG. 9 illustrates an additional example of a method for interference cancellation, performed in accordance with some embodiments. As similarly discussed above, interference cancellation operations may be performed to mitigate interference that may result from, for example, over-the-air leakage, on chip-leakage and/or static reflections from objects within an operational environment of a wireless device that are not objects of interest. In various embodiments, a method, such as method 900, may be performed to mitigate interference experienced by a transceiver during radar operations.

Method 900 may perform operation 902 during which an input signal may be transmitted. As similarly discussed above, the input signal may be a designated signal generated and transmitted via a transmit chain of a transceiver. Accordingly, in various embodiments the input signal may has a known data pattern as well as one or more transmission parameters configured in accordance with radar detection operations. In various embodiments, the transmitted signal is configured to be compliant with a standard signal waveform that the device is using when in data communication mode. For example, the transmitted signal may be compliant with a Wi-Fi standard waveform when the device is a Wi-Fi compliant wireless device.

Method 900 may perform operation 904 during which a reflected signal maybe received. As also discussed above, a receiver included in the transceiver may receive a signal as a result of the transmitting. The signal may be reflected off of an object of interest that has entered the range of the wireless device that includes the transceiver. Moreover, the reflected signal may also include other interference signals, such as over-the-air leakage, on chip-leakage and reflections from ambient static objects that are not of interest. Accordingly, the signal received during operation 904 may include a combination of all of these components.

Method 900 may perform operation 906 during which one or more interference cancellation operations may be performed using an adaptive filter. As similarly discussed above, the adaptive filter may have been previously configured and calibrated to identify and mitigate various types of interference. For example, the adaptive filter may have been calibrated when no object of interest was present, and thus may have been calibrated to mitigate over-the-air leakage, on chip-leakage and static reflections. Accordingly, during operation 906, and output of the adaptive filter may be combined with an output of the receiver via, for example a combiner. As discussed above, multiple adaptive filters may be used via one or more tap points. Moreover, such interference cancellation operations may be performed in the time domain and/or frequency domain.

Method 900 may perform operation 908 during which an output may be generated based on the one or more interference cancellation operations. Accordingly, once the adaptive filter has performed the interference cancellation operations, a resulting output may be provided as an output of the receiver. For example, an output of a combiner may be provided as an output that may be used for radar determination operations. As similarly discussed above, such radar operations may include phase and amplitude determinations to determine if an object of interest is present within a range of the wireless device.

Figure 10A:
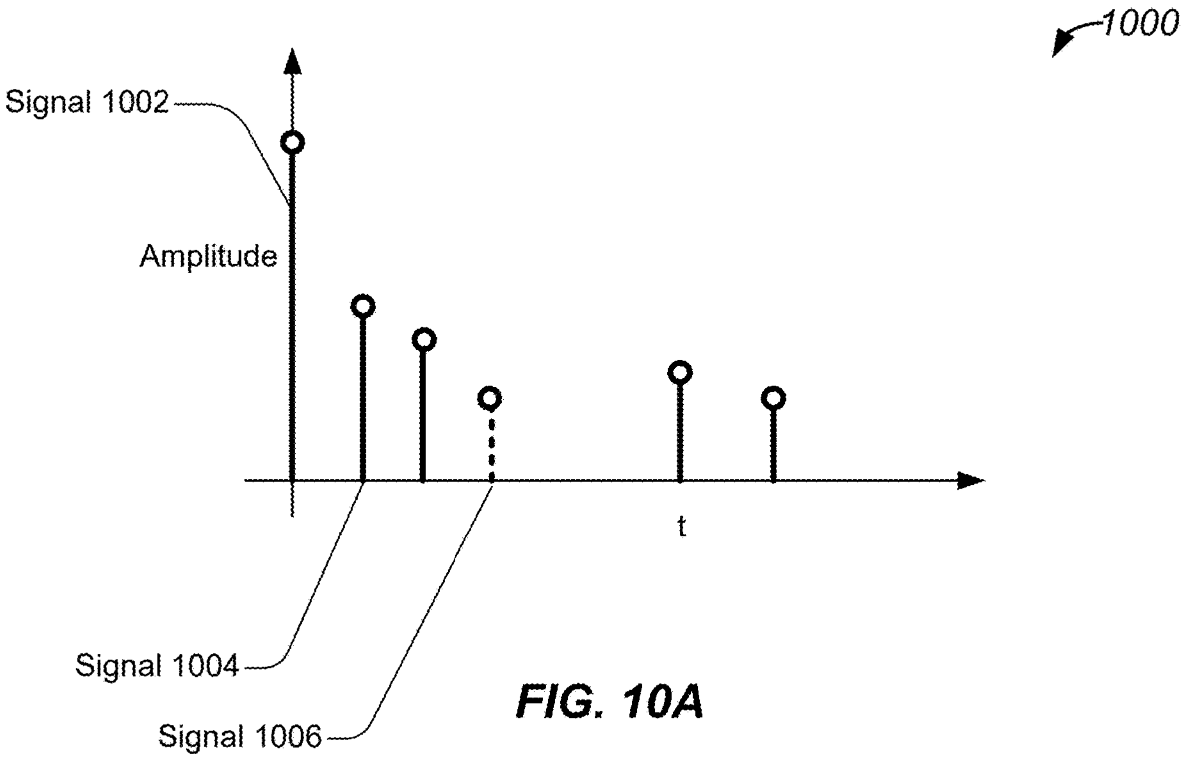
FIG. 10A illustrates a diagram of an example of interference in accordance with some embodiments.

FIG. 10A illustrates a diagram representative of a signal at an input of a receive antenna in accordance with some embodiments. As shown in diagram 1000, multiple signals have been received at a receiver and are represented within the plot included in diagram 1000 that illustrates amplitude of the signal on the y-axis, and a timing of reception, or temporal delay, on the x-axis. Accordingly, diagram 1000 illustrates interference experienced in a time-domain. In various embodiments, signal 1002 which has a relatively high amplitude and is received quickly may be from a type of interference such as over-the-air leakage and/or on chip-leakage that may be received from the transmitter. Other signals, such as signal 1004, may be reflections received from static objects within an ambient operational environment. Moreover, signal 1006 may be a reflection received from an object of interest that is an object that is being scanned for during radar detection operations. In various embodiments, signal 1006 is received from a reflection from a person when such radar operations are used for presence detection of people within an operational environment.

Figure 10B:
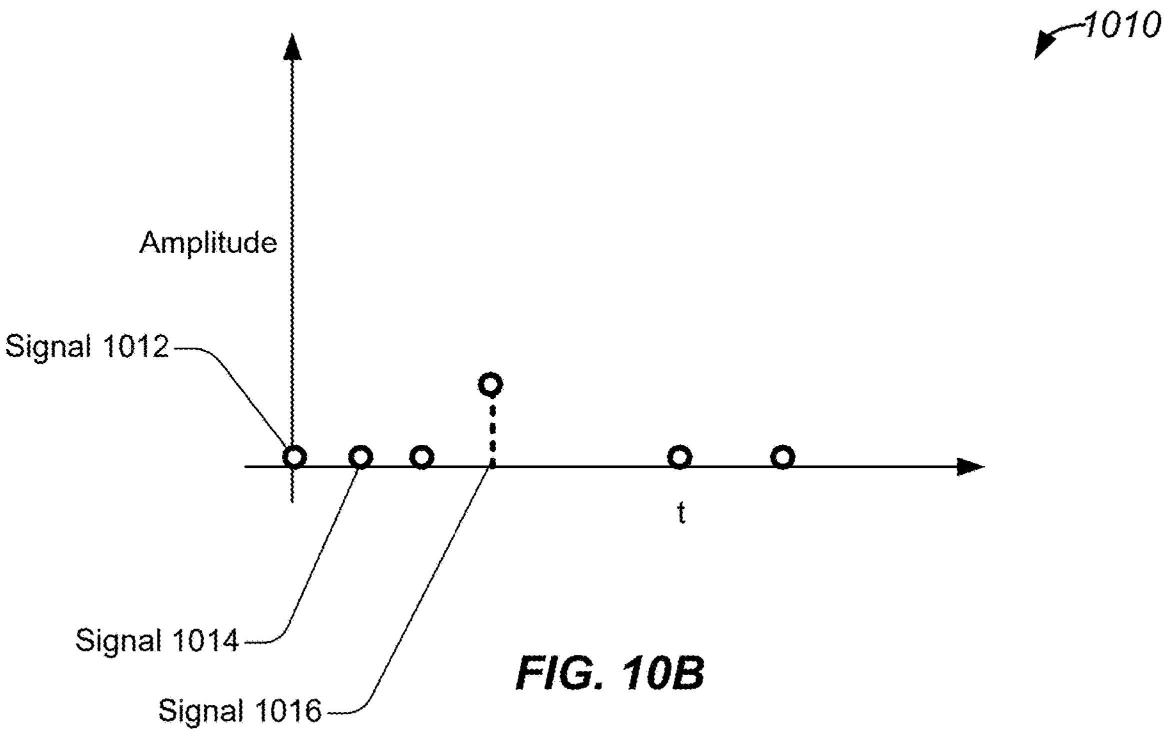
FIG. 10B illustrates a diagram of an example of interference cancellation, performed in accordance with some embodiments.

FIG. 10B illustrates a diagram representative of a signal at an output of a cancellation or combiner performed in accordance with some embodiments. As shown in diagram 1010, multiple signals have been received at a receiver and are again represented within the plot included in diagram 1010 that illustrates an amplitude of the signal on the y-axis, and a timing of reception, or temporal delay, on the x-axis. Accordingly, diagram 1010 also illustrates interference experienced in a time-domain, and further illustrates the result of interference cancellation operations performed within the time domain. As shown in diagram 1010, signal 1012, which may result from over-the-air leakage and/or on chip-leakage, and signal 1014, which may result from a static object, have been largely attenuated. Moreover, signal 1016 which may be a reflection received from an object of interest remains unaffected by the interference cancellation and is easily identifiable within the received signal. As discussed above, calibration operations may have been performed when the object of interest was not present, and signal 1016 was not present. In this way, the interference signals, such as signal 1012 and signal 1014, may have been accurately accounted for, and novel signals, such as signal 1016, may be easily identified.

Figure 11A:
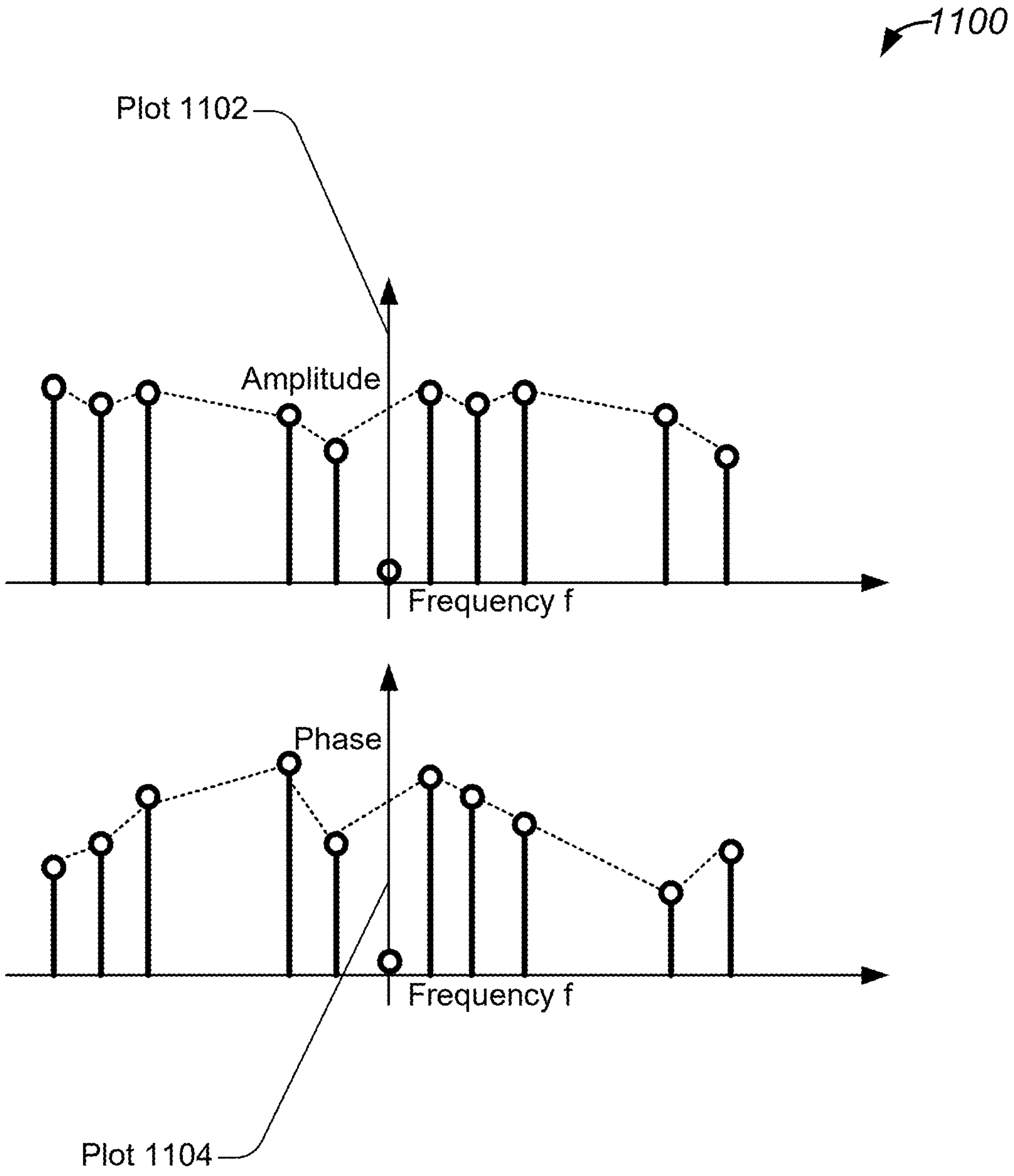
FIG. 11A illustrates a diagram of an example of interference in accordance with some embodiments.

FIG. 11A illustrates a diagram representative of a received signal at the an input of a receive antenna in frequency domain in accordance with some embodiments. As shown in diagram 1100, multiple signals have been received at a receiver and are represented within plot 1102 included in diagram 1100 that illustrates amplitude of components of the received signal on the y-axis, and a frequency on the x-axis. Moreover, plot 1104 illustrates a phase of components of the signal on the y-axis, and a frequency on the x-axis. Accordingly, diagram 1100 illustrates interference experienced in a frequency-domain and across various frequency channels used by the transceiver for wireless communication and radar operation. Accordingly, as similarly discussed above, the received signal may include various types of interference such as over-the-air leakage and on chip-leakage that may be received from the transmitter as well as other signals that may be reflections received from static objects within an ambient operational environment.

Figure 11B:
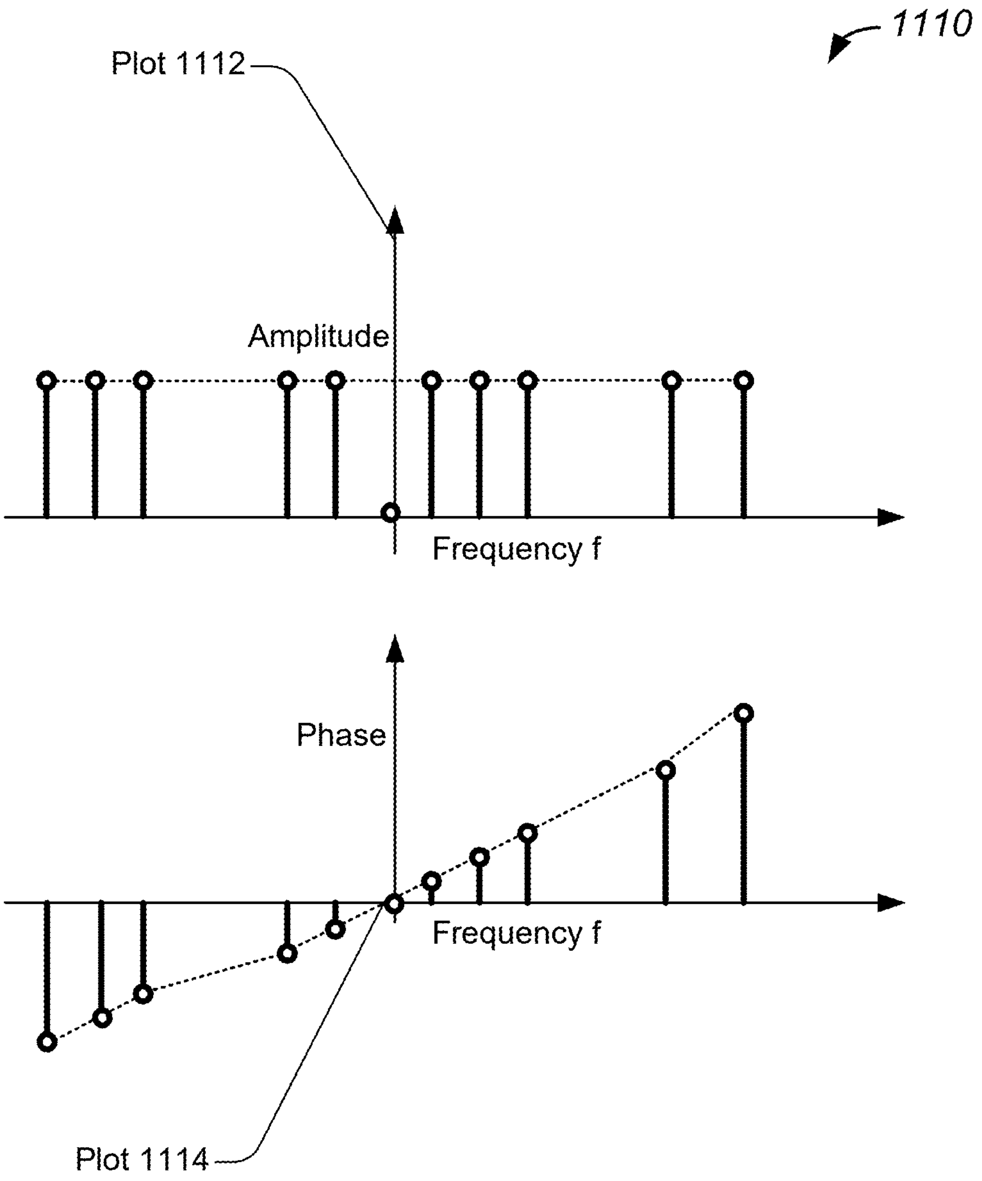
FIG. 11B illustrates a diagram of an example of interference cancellation, performed in accordance with some embodiments.

FIG. 11B illustrates a diagram representative of a received signal at an output of cancellation operation in frequency domain performed in accordance with some embodiments. As shown in diagram 1110, multiple components of a received signal are again represented within plots included in diagram 1110. As similarly discussed above, plot 1112 illustrates an amplitude of components of the received signal on the y-axis, and a frequency on the x-axis. Moreover, plot 1114 illustrates a phase of components of the signal on the y-axis, and a frequency on the x-axis. However, both plot 1112 and 1114 illustrate such amplitudes and phases after interference cancellation operations have been performed. Accordingly, as shown in plot 1112, an amplitude of the different frequency components of the received signal may adjusted such that they have been set to a designated threshold value. Moreover, plot 1114 illustrates a phase of the frequency components being adjusted to achieve a constant slope which is a representation of a desired object reflected signal's relative delay. As discussed above, calibration operations may have been performed when an object of interest was not present to facilitate accuracy of the calibration operations.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:

transmitting, using a first antenna, an input signal using a transmitter of a transceiver included in a wireless device;

receiving an interference signal at a receiver of the transceiver, wherein the interference signal includes one or more of an over-the-air leakage signal and a reflected signal received using a second antenna;

performing interference cancellation operations on the interference signal based, at least in part, on one or more adjustments to the receiver determined based on the input signal and the received interference signal, the interference cancellation operations comprising using a first adaptive filter for over-the-air leakage components of the interference signal, and using a second adaptive filter for static reflection components of the interference signal; and generating, using the transceiver, an output signal based, at least in part, on the interference cancellation operations.

2. The method of claim 1, wherein the performing of the interference cancellation operations further comprises:

applying, using the first adaptive filter, first cancellation to the received interference signal.

3. The method of claim 2 further comprising:

adjusting, during a calibration phase, the first adaptive filter based, at least in part, on the input signal and the interference signal.

4. The method of claim 3, wherein the adjusting further comprises:

determining one or more weights for the first adaptive filter.

5. The method of claim 2, wherein the first cancellation is performed in a time domain.

6. The method of claim 2, wherein the first cancellation is performed in a frequency domain.

7. The method of claim 2 further comprising:

applying, using the second adaptive filter, second cancellation to the received interference signal.

8. The method of claim 7, wherein the first cancellation cancels over-the-air leakage interference in a time domain, and wherein the second cancellation cancels interference from static reflections in a frequency domain.

9. The method of claim 7, wherein the transceiver is compatible with a wireless communications protocol, and wherein the transceiver is operating in a radar mode.

10. A system comprising:

a first antenna and a second antenna configured to transmit and receive wireless signals;

a processing device comprising one or more processors configured to generate an input signal;

a transceiver comprising a transmitter configured to:

transmit the input signal received from the processing device;

the transceiver further comprising a receiver configured to:

receive an interference signal including one or more of an over-the-air leakage signal and a reflected signal;

performing interference cancellation operations on the interference signal based, at least in part, on one or more adjustments determined based on the input signal and the received interference signal, the interference cancellation operations comprising using a first adaptive filter for over-the-air leakage components of the interference signal, and using a second adaptive filter for static reflection components of the interference signal; and generate an output signal based, at least in part, on the interference cancellation operations.

11. The system of claim 10 further comprising:

the first adaptive filter configured to apply first cancellation to the received interference signal, wherein the first adaptive filter is configured to be adjusted, during a calibration phase, based on the input signal and the interference signal.

12. The system of claim 11, wherein the adjusting comprises determining one or more weights for the first adaptive filter.

13. The system of claim 11 further comprising:

the second adaptive filter configured to apply second cancellation to the received interference signal.

14. The system of claim 13, wherein the first cancellation cancels over-the-air leakage interference in a time domain, and wherein the second cancellation cancels interference from static reflections in a frequency domain.

15. The system of claim 13, wherein the transceiver is compatible with a wireless communications protocol, and wherein the transceiver is operating in a radar mode.

16. A device comprising:

one or more processors configured to generate an input signal; and a transceiver comprising:

a transmitter configured to transmit the input signal using a first antenna;

a receiver configured to:

receive, using a second antenna, an interference signal including one or more of an over-the-air leakage signal and a reflected signal;

performing interference cancellation operations on the interference signal based, at least in part, on one or more adjustments determined based on the input signal and the received interference signal, the interference cancellation operations comprising using a first adaptive filter for over-the-air leakage components of the interference signal, and using a second adaptive filter for static reflection components of the interference signal; and generate an output signal based, at least in part, on the interference cancellation operations.

17. The device of claim 16 further comprising:

the first adaptive filter configured to apply first cancellation to the received interference signal, wherein the first adaptive filter is configured to be adjusted, during a calibration phase, based on the input signal and the interference signal.

18. The device of claim 17, wherein the adjusting comprises determining one or more weights for the first adaptive filter.

19. The device of claim 17 further comprising:

the second adaptive filter configured to apply second cancellation to the received interference signal.

20. The device of claim 19, wherein the first cancellation cancels over-the-air leakage interference in a time domain, and wherein the second cancellation cancels interference from static reflections in a frequency domain.

* * * * *